United States Patent Office 3,111,048
Patented Nov. 19, 1963

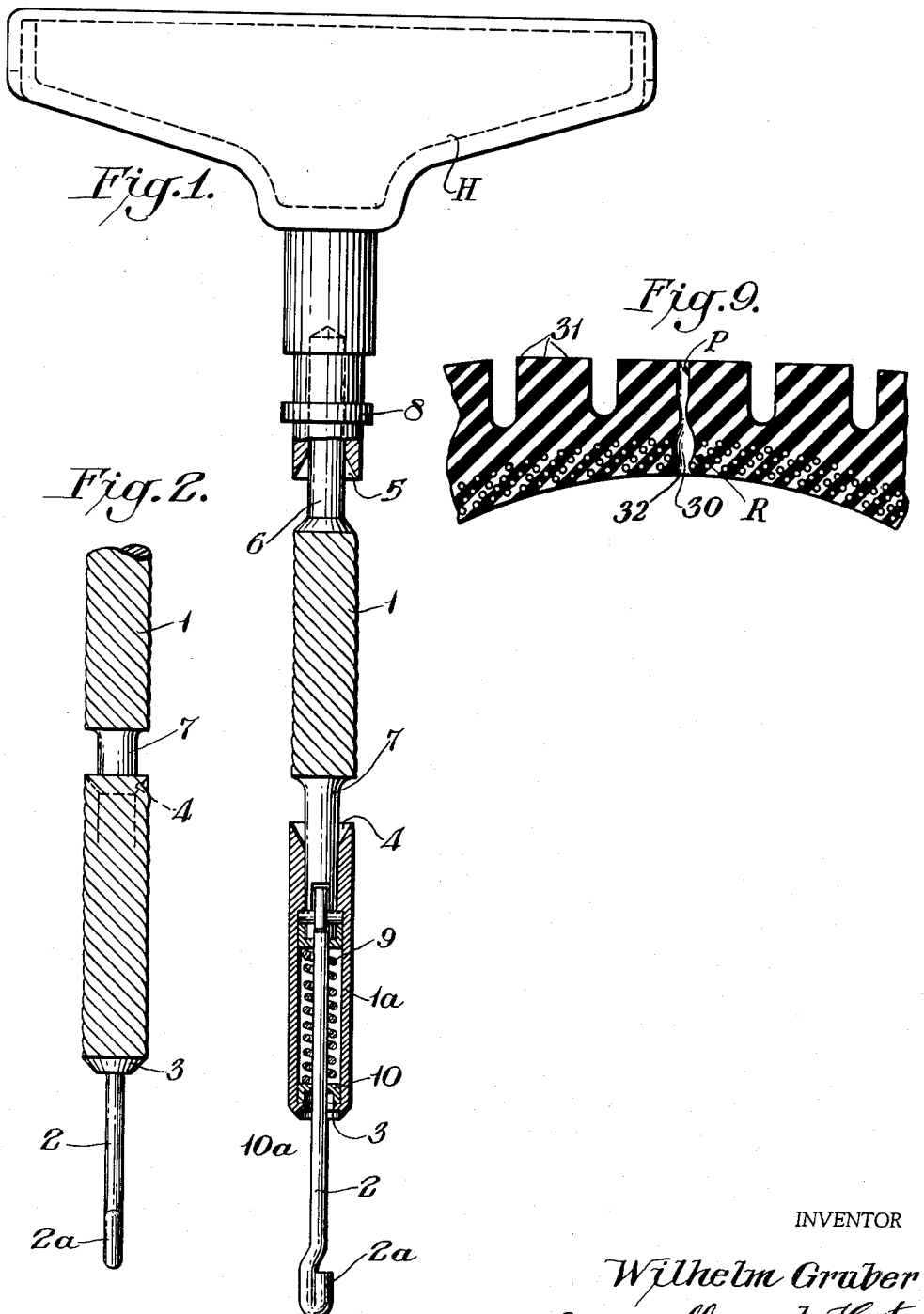

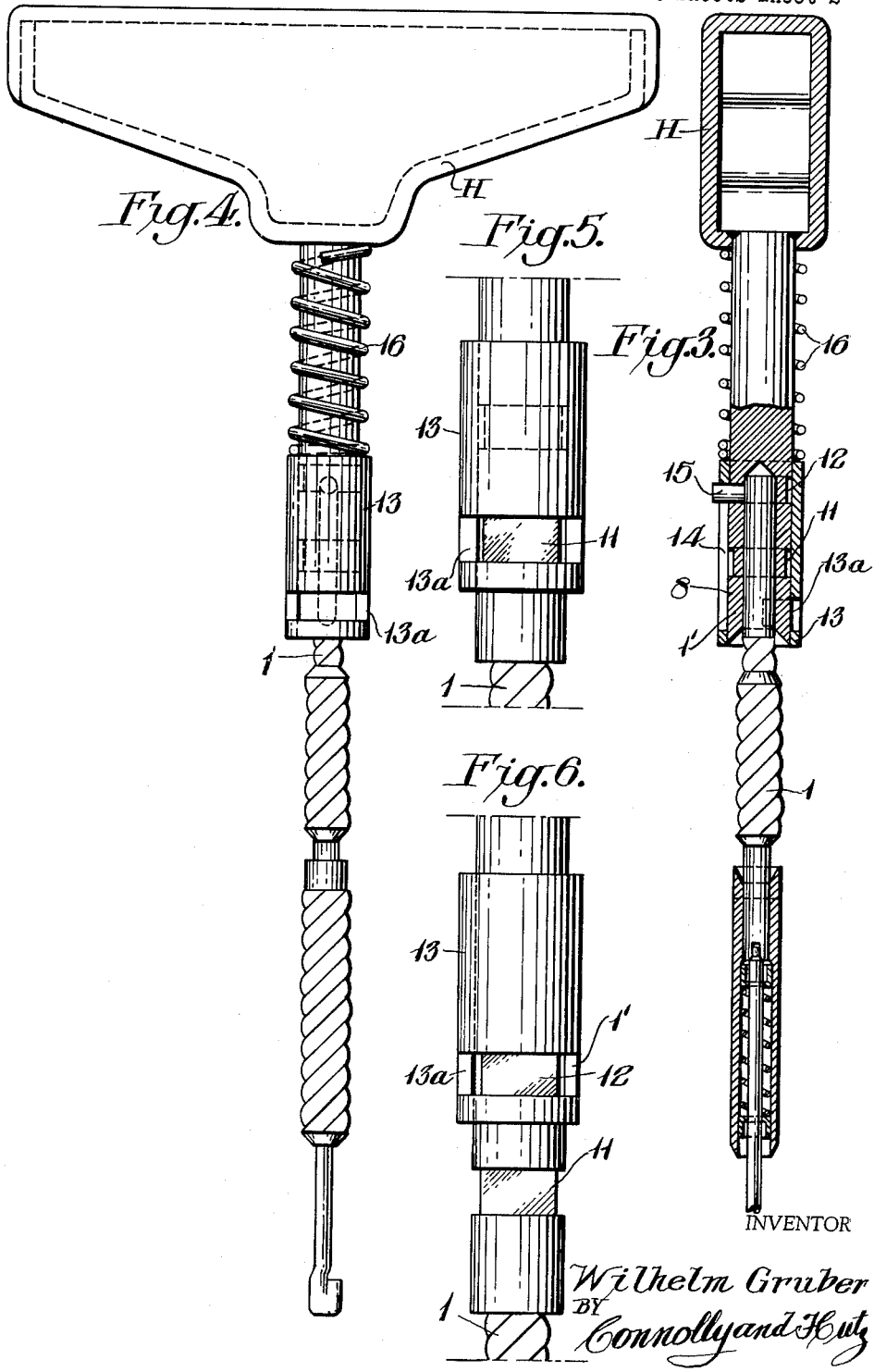

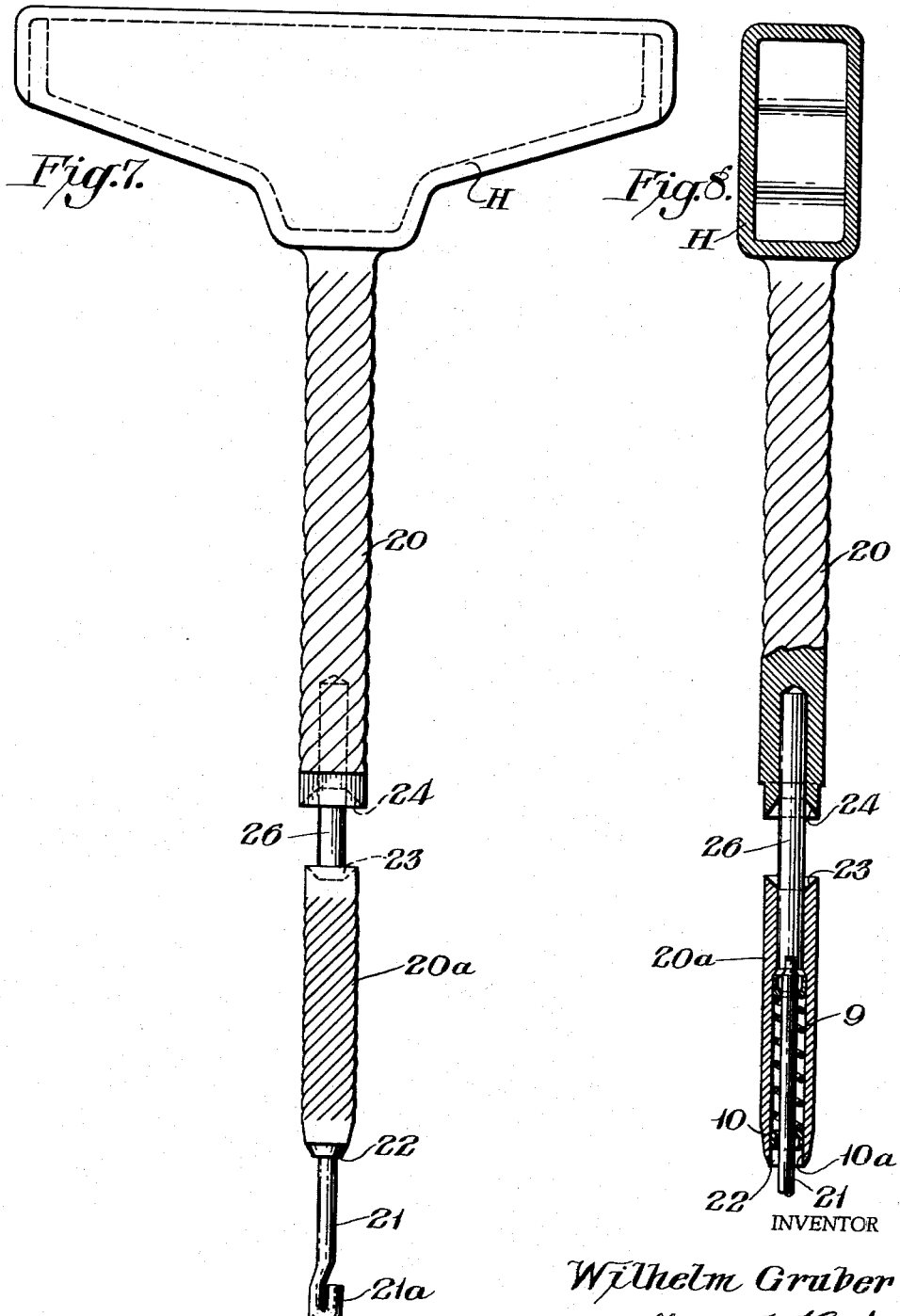

3,111,048
INSTRUMENT FOR REPAIRING
TUBELESS TIRES
Wilhelm Gruber, Mohlstr. 2, Munich, Germany
Filed Dec. 12, 1961, Ser. No. 158,808
5 Claims. (Cl. 81—15.2)

The present invention relates to a cutting instrument or tool for use in preparing punctured holes in tubeless tires for subsequent receipt of a repair plug and is a continuation-in-part of U.S. patent application Serial No. 734,482, filed May 12, 1958, now Patent No. 3,013,454.

The removing and replacing of tubeless tires mounted on wheels for repair thereto endangers the joint formed between the bead of the tire and the wheel flange, particularly if the removal and replacement operations are not carried out carefully. Therefore, it is desirable to repair the tire while still on the wheel.

For filling in small puncture holes in the tire in present practice, corresponding quantities of hardening and vulcanizing rubber paste are pressed into the holes. When squeezing the material into an open hole a large part of the paste passes downwardly into the empty tire chamber. When pulling out the squeezing nozzle or other tool the closing of the hole wall forces a portion of the pressed-in paste to the outside. A further portion of the paste is squeezed out of the hole channel because of the squeezing action which occurs during subsequent driving before a complete hardening or vulcanization can occur. Another prior art difficulty is that the inside wall of the hole made by a nail or the like can be coated with rust, oil or the like whereby it is more or less impossible for the rubber paste to properly engage the hole wall.

Also previously known are cylindrical plugs of prevulcanized rubber which can be clamped in the eye of an awl by which they are then pulled into the hole. During this forcing of the plug into the tight unprepared tire hole the cylindrical rubber plugs tend to tear at the awl. Furthermore, no punctures form a perfectly round cylindrical hole in the tire. In every case formation of cracks occurs. A pre-vulcanized rubber plug which is only moistened with rubber solution and which is pressed into the unprepared tire hole is a foreign body in the tire and cannot fill out the side cracks of the hole. The pressure of a pressed-in rubber body which has a Shore hardness of about 65 Shore is too great for the cushioning rubber and the connecting rubber coating of the tire which generally has a Shore hardness of about 40, whereby a further tearing of the cracks in the walls of the hole occurs. Also, when forcing in the rubber plug, which usually has a turned over edge at the eye of the awl, a double diameter of rubber results (the diameter of the plug plus that of the turned over edge) so that in addition to the thick eye portion of the awl, a comparatively thick body is pressed into the unprepared tight hole, and the cracks in the hole walls rip farther. A durable and dependable sealing is accordingly not easily obtained with any of the prior art processes, plugs and tools.

It is an object of this invention to provide a novel and improved cutting tool for preparing a punctured hole in a tubeless tire for the subsequent receipt of a repair plug.

It is a still further object of this invention to provide a tool for carrying out the repair of a tire without complicated instructions and even on the roadway.

Still another object of this invention is the provision of a tool for tire repair made with the usual air pressure in the tire or even under decreased air pressure in the tire.

This invention will be more clearly understood upon consideration of the following description taken together with the accompanying drawings in which:

FIGURE 1 is a front view partly in section of the tire puncture repair processing tool in accordance with the present invention;

FIGURE 2 is a fragmentary view of the tool of FIGURE 1;

FIGURE 3 is an end view partly in section and partly broken away of a modified form of tool similar to that of FIGURE 1;

FIGURE 4 is a front view of the tool of FIGURE 3;

FIGURES 5 and 6 are detailed views showing steps in the use of the tool of FIGURES 3 and 4;

FIGURES 7 and 8 are views of a further form of tool representative of the present invention; and FIGURE 9 is a fragmentary view showing a portion of the tire and the shape of the hole produced by the tools of the invention.

One of the tools of the present invention has a generally cylindrical body whose upper end is set tightly into a handle while the lower (entering) end is hollow and has a ring-shaped downwardly directed cutting edge which houses a probe. In about the middle of the body there is arranged a tapering and upwardly directed second ring-shaped cutting edge, and close to the handle a further tapering and a third, downwardly directed, cutting edge. Above the latter there is a check ring of a larger diameter. The diameters of the three cutting edges are chosen in such a way that the diameter of the lower one is smaller, the diameter of the middle one is the same as, and the diameter of the upper check ring is larger than the largest diameter of the cylindrical body.

FIGURES 1 and 2 are views of the above type of tool. The cylindrical body 1 is inserted with its upper end, for example with the aid of screw threads, into the handle H and has a lower extension 1a. The lower extension is hollow and in it there is stored axially the probe needle 2 with bent end 2a. In the body there are also provided two tapers 6 and 7 and the three ring-shaped cutting edges 3, 4 and 5. Above the uppermost cutting edge 5 is a ring-shaped stop 8 on the body 1 which has a larger diameter than the three cutting rings 3, 4 and 5. The diameter of the cutting edges of the rings 3, 4 and 5 are different, the diameter of the lower ring being a little bit smaller than the diameter of the body 1, and the diameter of the ring 5 being a little bigger than the diameter of the body.

In the inside of the lower hollow part 1a there is provided a spiral spring 9 and a cup 10 which is perforated in the middle. The spring 9 presses the cup 10 downward against a stop 10a at the inside wall of the extension in the immediate vicinity of the ring 3. The cup 10 can be pushed up along the probe needle 2 against the effect of spring 9. The cylindrical surfaces of the body are provided between the lower and the upper cutting edge, except for the tapered portions, with a milled edge or corrugation, preferably in screw (helical) form, to ease the insertion of the apparatus into the tire hole when the body is rotated around its longitudinal axis. Besides, this corrugation has the purpose to roughen the cut hole. This is absolutely essential for the subsequent vulcanization of the repair body into the tire.

For use, the apparatus with bent end 2a of the probe needle 2 is inserted into the tire hole. The probe needle thereby serves as a feeler to accurately insert the apparatus into the hole. By noting from the positive travel of the probe needle that the apparatus is correctly placed in the hole channel, and that a second hole is not being forced, the apparatus is inserted into the hole channel under uniform turning up to stop 8, so that first the cutting ring 3 and then near the end of the inserting motion the cutting ring 5 becomes effective. Ring 3 peels off the unevenness from the total length of the hole channel wall so that a thin, more or less unitary cylindrical layer is cut out of the tire mass. This layer first pushes itself against spring 9 into the inside of the hollow part 1a of the body 1.

In the last phase of the tool insertion, the upper ring 5 superimposes on the tread surface of the tire and cuts a cylindrical piece out of the same. When the apparatus is inserted to the stop 8 into the tire hole, the lower part of the same extends up to about the tapering 7 beyond the tire's inside wall and into the inside space. Now the apparatus is screwed out of the tire hole by rotation in the opposite direction. Thereby first the wide shoulder at the lower end of the tapering 6 lifts out the rubber ring which was cut out of the tire tread surface by the upper cutting edge 5 in the last phase of inserting the apparatus. At the same time the cutting edge 4 which is directed upwardly becomes effective and cuts off any possible loose inwardly protruding cord threads preventing thereby the absorption and conducting of compressed air into the carcass after insertion of the repair body. Such loose cord threads can convey so much compressed air into the fabric of the carcass that hollow spaces between the carcass and the tread can be created and which may lift up the tread or even cause the tire to burst. Further the opening of the hole on the butyl layer is rounded off as at 32 in FIG. 9 in order to prevent sharp edges to cut into the repair body. Thereby, the hole channel is calibrated exactly cylindrically with a diameter which is a little smaller than the cut-out previously effected by ring 5 in the tread surface. After pulling the tool out of the hole channel, the hole has a diameter as indicated in FIGURE 9. The spring 9 with the aid of cup 10 ejects the tire parts which are cut out by ring 3 to the outside so that the material can easily be removed from the apparatus. The tire material cut out by cutting edges 4 and 5 now lie on the outside surface of the body and can also be easily removed. The apparatus can accordingly be used again at once.

FIGURES 3-6 show a modified form of one of the devices of the invention. Here the main body portions 1, 1' are formed with two cylindrical taperings or grooves 11 and 12, which are indicated by contrasting colors, for example red and green or yellow and blue. The grooves are shown in the main body 1' on which is resiliently mounted a casing 13 which has a window 13a about the same longitudinal height as the grooves 11 and 12. A longitudinal slot 14 in the casing 13 engages a pin 15 which is rigidly affixed to part 1. Casing 13 is urged downwardly by means of a spring 16, and when the tool is used, is displaced upwardly along the main body against the pressure of spring 16.

The above-described construction makes an especially suitable use of the apparatus possible. For example, it might be assumed that the lower groove 11 is marked red and the upper groove 12 green. When the hole in the tire to be repaired lies in the upper edge of the tire profile, then one drills with the device as described so far, until the red marking of groove 11 is visible in its full width in window 13a; if the hole to be repaired lies in the depth of the profile, then one drills with the device until the green marking is visible in its full width in window 13a. As soon as the suitable marking shows in window 13a, the device is moved out of the tire in the above-mentioned way.

The diameter of the calibration apparatus can be chosen to correspond to the size of the tire hole to be repaired. It is best to have a variety of calibration devices of different diameters in order to have the right device at hand in order to match the tire hole to be repaired.

FIGURES 7 and 8 show another embodiment of the tool. Here, a cylindrical body 20 is shown with its upper end welded or otherwise secured to the handle H and has a lower hollow extension 20a in which is stored a probe needle 21 with bent end 21a. In the tool there are also provided three ring-shaped cutting edges 22, 23 and 24. Here cutting edges 23 and 24 are much closer together than with the embodiment of FIGURES 1-6. With this arrangement, better alignment of the cuts is achieved. The diameter of the cutting edge of the rings is different, the diameter of the lower ring being a little bit smaller than the diameter of the ring 23 and the diameter of the ring 24 being slightly larger than the diameter of the ring 23.

In the inside of the lower hollow part 20a, there is provided a spiral spring arrangement as described with respect to FIGURES 1 and 2. The operation is the same except that the portions cut out of the tire are collected on the cylindrical shaft portion 26 when the tool is removed from the hole in the tire.

FIGURE 9 illustrates the shape of the hole in the tire formed by the above-described tools. The hole is shown at 30. The hole has on the top a cone-shaped enlargement, then a narrow shaft and at the bottom again a cone or ball-shaped enlargement. The purpose and advantage of this particular shape of the cut-out hole is to be explained as follows. The multiple layers of canvas 31 of a tire (so-called carcass) as seen in FIGURE 9 are punctured if a nail or any pointed object punctures the tire mounted on a wheel. Thereby, the air which is under excess pressure within the tire leaks past the nail point and reaches the canvas because the nail shaft moves back and forth during continued driving. The air accumulates between the canvas layers and forms air bubbles between the canvas layers, breaking the adhesive compound joining the canvas layers and finally destroying it. Therefore, the air has to be removed from the layers to the outside. For this purpose, the hole 30 cut out by the calibrating apparatus has the special profile P at the top which adapts to the shape of the repair piece. The shaft of the repair piece (not shown) is shaped in such a way, that its thick, cylindrical part is only so high that its upper borderline is just even with the lower borderline R of the tire's canvas layers when the repair piece is inserted into the hole. Only the conically tapered part of the repair piece's shaft remains above this borderline R within the hole. This tapered part fits then not quite so tightly within the hole in the canvas layers of the tire, so that tiny air bubbles from the canvas layer can still press to the outside between the tapered shaft of the sealing body and the walls of the hole.

Although the invention has been described with reference to specific embodiments, it is not intended that the same be limited thereto.

What is claimed is:

1. A cutting tool for use in repairing punctures in tubeless tires comprising an elongated shaft, three spaced cutting rings at longitudinally spaced locations along said shaft, the cutting rings nearest each end of the shaft facing the end of the shaft first entering the tire casing puncture, and the intermediate cutting ring facing the opposite end of the shaft, the cutting diameter of the respective rings being progressively larger as they extend from the end of the shaft first entering the tire casing puncture.

2. The combination of claim 1 in which the elongated shaft surface is helically fluted in order to roughen the hole and to engage the walls of a puncture and threadedly drive the shaft longitudinally along the puncture as the shaft is rotated around its longitudinal axis.

3. The combination of claim 1 wherein a feeler guide is located at the extreme end of the shaft first entering the tire casing puncture for guiding the tool in the exact direction of the hole in order to prevent the cutting of a second hole.

4. The combination of claim 1 in which the shaft has a smaller diameter than the inside diameter of the cutting edge of the cutting rings at those portions of the shaft adjacent the cutting edges.

5. A cutting tool according to claim 1 wherein an axially movable casing is supported on said shaft, said casing having a window, a spring is supported around said shaft above said casing, the lower end of said casing contacting the tire surface when inserted in said puncture to be urged upwardly on said shaft against said spring, and two grooves of differing color are provided in spaced relation at such points on said shaft as to become visible alternatively through said casing window depending upon the height to which the casing is urged against said spring by said tire surface.

References Cited in the file of this patent

UNITED STATES PATENTS

| | | |
|---|---|---|
| 712,367 | Dummer | Oct. 28, 1902 |
| 718,996 | Franz | Jan. 27, 1903 |
| 1,192,937 | Rood | Aug. 1, 1916 |
| 1,430,373 | Hennings | Sept. 26, 1922 |
| 1,770,557 | St. Onge | July 15, 1930 |
| 1,778,686 | Plummer | Oct. 14, 1930 |